(12) United States Patent
Taniguchi

(10) Patent No.: US 8,312,044 B2
(45) Date of Patent: Nov. 13, 2012

(54) INFORMATION PROCESSING APPARATUS, INFORMATION PROCESSING METHOD AND COMPUTER READABLE MEDIUM

(75) Inventor: Shinichiro Taniguchi, Tokyo (JP)

(73) Assignee: Fuji Xerox Co., Ltd, Tokyo (JP)

( * ) Notice: Subject to any disclaimer, the term of this patent is extended or adjusted under 35 U.S.C. 154(b) by 190 days.

(21) Appl. No.: 12/780,371

(22) Filed: May 14, 2010

(65) Prior Publication Data

US 2011/0153671 A1 Jun. 23, 2011

(30) Foreign Application Priority Data

Dec. 18, 2009 (JP) ................................. 2009-287633

(51) Int. Cl.
*G06F 17/30* (2006.01)

(52) U.S. Cl. ........ 707/786; 707/781; 707/783; 707/784; 707/785; 707/E17.005

(58) Field of Classification Search .................. 707/786, 707/781, 783, 784, 785, E17.005
See application file for complete search history.

(56) References Cited

U.S. PATENT DOCUMENTS

| 5,956,715 A * | 9/1999 | Glasser et al. .......................... 1/1 |
| 2002/0143943 A1* | 10/2002 | Lee et al. ....................... 709/225 |
| 2003/0046576 A1* | 3/2003 | High et al. ..................... 713/200 |
| 2003/0188198 A1* | 10/2003 | Holdsworth et al. ......... 713/201 |
| 2004/0125402 A1 | 7/2004 | Kanai et al. |
| 2005/0015674 A1* | 1/2005 | Haugh ............................. 714/38 |
| 2005/0262132 A1* | 11/2005 | Morita et al. ................. 707/102 |
| 2007/0153814 A1* | 7/2007 | Canning et al. ............... 370/401 |

FOREIGN PATENT DOCUMENTS

JP A-2004-133816 4/2004

* cited by examiner

*Primary Examiner* — Fred I Ehichioya
*Assistant Examiner* — Shiow-Jy Fan
(74) *Attorney, Agent, or Firm* — Oliff & Berridge, PLC

(57) ABSTRACT

An information processing apparatus includes a creation unit and a registration unit. The creation unit acquires first limited use information which is associated with a designated object and stored in an object storage unit from the object storage unit in accordance with an instruction to specify the designated object, and creates second limited use information containing information indicated by the acquired first limited use information and described in a different form from the acquired first limited use information. The registration unit registers the second limited use information created by the creation unit in a second limited use storage unit.

6 Claims, 11 Drawing Sheets

| CREATOR | TARO FUJI | | |
|---|---|---|---|
| PRIVILEGE | USER/GROUP | POLICY ACCESS RIGHT | OBJECT ACCESS RIGHT |
| | [POLICY CREATOR] | EDIT, CHANGE STATUS | - |
| | [OBJECT CREATOR] | - | READ, WRITE, CHANGE, PRINT, COPY |
| | HANAKO FUJI | - | READ, WRITE, CHANGE, PRINT, COPY |
| | TARO FUJI | - | READ, WRITE, CHANGE |
| | DEVELOPER T | - | READ |
| POLICY FOR DERIVED OBJECT | APPLY THIS POLICY | | |
| VALID DURATION | [UNSET] | | |
| OFFLINE DURATION | [UNSET] | | |
| PRINT OPTION | TINT BLOCK | | |
| TEMPORARY USE | FORBIDDEN | | |

FIG. 3

| ACL (ObjectK) | |
|---|---|
| USER/GROUP | PRIVILEGE |
| HANAKO FUJI | FULL CONTROL | ~L1
| TARO FUJI | READ, RIGHT, CHANGE | ~L2
| DEVELOPER T | READ | ~L3

FIG. 4

| ATTRIBUTE INFORMATION (ObjectK) | |
|---|---|
| ATTRIBUTE | VALUE |
| TYPE | FOLDER |
| OBJECT NAME | T PLANNING |
| CREATOR | HANAKO FUJI |
| INHERITANCE OF ACL | APPLY TO CHILD OBJECT |
| ... | ... |

FIG. 5

| CREATOR | TARO FUJI | | |
|---|---|---|---|
| PRIVILEGE | USER/GROUP | POLICY ACCESS RIGHT | OBJECT ACCESS RIGHT |
| | [POLICY CREATOR] | EDIT, CHANGE STATUS | - |
| | [OBJECT CREATOR] | - | READ, WRITE, CHANGE, PRINT, COPY |
| | HANAKO FUJI | - | READ, WRITE, CHANGE, PRINT, COPY |
| | TARO FUJI | - | READ, WRITE, CHANGE |
| | DEVELOPER T | - | READ |
| POLICY FOR DERIVED OBJECT | APPLY THIS POLICY | | |
| VALID DURATION | [UNSET] | | |
| OFFLINE DURATION | [UNSET] | | |
| PRINT OPTION | TINT BLOCK | | |
| TEMPORARY USE | FORBIDDEN | | |

(Column A indicates the HANAKO FUJI row access rights.)

FIG. 6

| OBJECT NAME | ACL | | CONFLICT FLAG |
|---|---|---|---|
| | USER/GROUP | PRIVILEGE | |
| PERSONNEL | TARO FUJI | FULL CONTROL | TRUE |
| WEEKLY REPORT | TARO FUJI | READ, WRITE, CHANGE | TRUE |
| | DEVELOPER T | READ, WRITE | |
| SAMPLE CODE | DEVELOPER T | FULL CONTROL | FALSE |

INFORMATION PROCESSING APPARATUS, INFORMATION PROCESSING METHOD AND COMPUTER READABLE MEDIUM

CROSS-REFERENCE TO RELATED APPLICATIONS

This application is based on and claims priority under 35 USC 119 from Japanese Patent Application No. 2009-287633 filed on Dec. 18, 2009.

BACKGROUND

1. Technical Field

The present invention relates to an information processing apparatus, an information processing method and a computer readable medium.

2. Related Art

There is proposed a technique for setting information of limited use expressed in a form called ACL (Access Control List) for each object such as an electronic document file or a file storing folder. ACL includes an ACE (Access Control Entry) indicating each user/group and an access right of the user/group. By this technique, use of each object is limited in accordance with the ACL set for the object.

In addition, there is proposed a technique for limiting use of each object in accordance with a security policy (hereinafter simply referred to as "policy") representing a policy of limited use of the object to prevent the object from being used illegally. For example, the policy indicates kinds of operations permitted or forbidden to each user/user group, a valid duration for which use of the object is permitted, etc. In a technique using policies, different policies are defined in advance and information indicating which policy should be selected for limited use of each object is registered while associated with the object. Thus, when an object is used, use of the object is limited in accordance with contents of a policy associated with the object while the contents of the policy are referred to.

SUMMARY

According to an aspect of the invention, an information processing apparatus includes a creation unit and a registration unit. The creation unit refers to an object storage unit which stores each object as one information unit to be subjected to limited use and first limited use information containing each combination of an operation subject performing operations on the object and kinds of operations permitted or forbidden to the operation subject while associating the object with the first limited use information. The creation unit acquires the first limited use information which is associated with a designated object and stored in the object storage unit from the object storage unit in accordance with an instruction to specify the designated object, and creates second limited use information containing information indicated by the acquired first limited use information and described in a different form from the acquired first limited use information. The registration unit registers the second limited use information created by the creation unit in a second limited use storage unit.

BRIEF DESCRIPTION OF THE DRAWINGS

Exemplary embodiment(s) of the present invention will be described in detail based on the following figures, wherein:

FIG. 3 is a table showing an example of contents of an ACL set for an object;

FIG. 4 is a table showing an example of contents of attribute information of an object;

FIG. 5 is a table showing an example of contents of a policy created in the policy registration apparatus;

FIG. 6 is a table showing an example of contents of a non-inherited ACL list;

DETAILED DESCRIPTION

Figure 1:
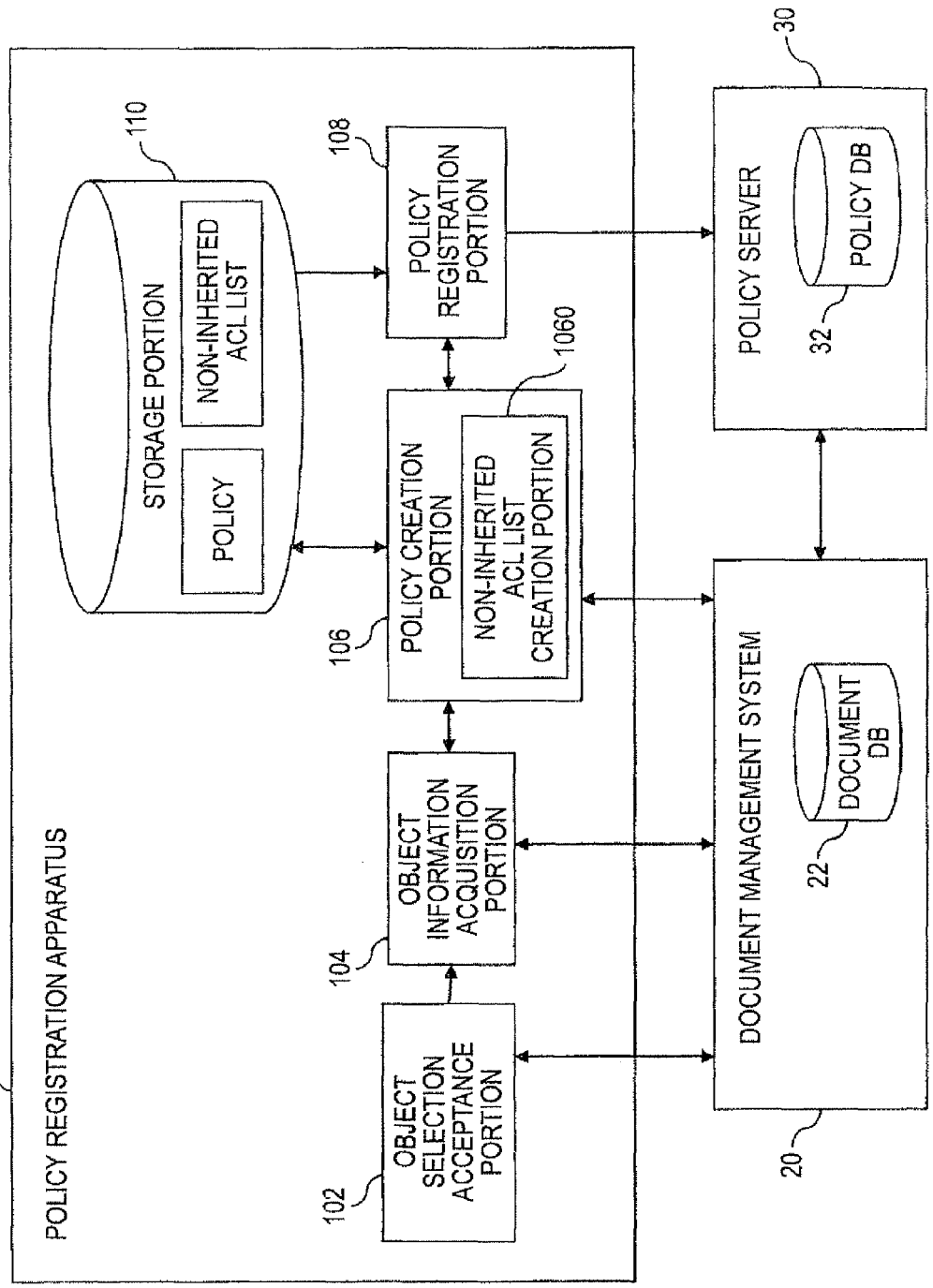
FIG. 1 is a block diagram schematically showing an internal configuration of a policy registration apparatus.

FIG. 1 shows an example of schematic configuration of a policy registration apparatus which functions as an information processing apparatus according to an exemplary embodiment of the invention. In the example shown in FIG. 1, the policy registration apparatus 10 is connected to a document management system 20 and a policy server 30 through a network (not shown). The policy registration apparatus 10 creates a policy to be set for each object managed by the document management system 20, and registers the created policy in the policy server 30. The policy registration apparatus 10 will be described later in detail.

The document management system 20 manages the object which is one unit of information to be subjected to limited use based on the policy. In this example, the object is a file or a file storing folder. The file may be an electronic document file, e.g. containing text data, image data, audio data, etc. In addition, one file may contain a plurality of kinds of data. One folder may store not only files but also other folders. In addition, the folder may be referred to as "directory". The document management system 20 includes a document DB (database) 22 for storing information of objects to be managed. Information necessary for management of objects, such as identification information, attribute information and storage position information of each object, is stored in the document DB 22. In this example, an ACL for limiting use of each object is set for the object and stored in the document DB 22. Information indicating a hierarchical structure formed from objects is also stored in the document DB 22. This hierarchical structure is formed based on one object as a folder and another object (file or folder) stored in the object. In the following description, when one object A which is a folder stores another object B, the object A is called "parent object" or simply "parent" of the object B while the object B is called "child object" or simply "child" of the object A. With respect to each object, information indicating at least either of parent and child of the object is stored as information showing a hierarchical structure in the document DB 22.

The policy server 30 manages policies created by the policy registration apparatus 10. Upon reception of policies from the policy registration apparatus 10, the policy server 30 registers the received policies in a policy DB 32 while associating identification information of each policy with the contents of the policy. When registration of the policies in the policy DB 32 is completed, any one of the policies in the policy DB 32 is set for an object which is one of objects in the document DB 22 and which is required to be subjected to limited use based on the policy by a system administrator, user or the like. For example, such policy setting is performed when identification information of an object and identification information of a policy set for the object are registered in the document DB 22 while they are associated with each other. Alternatively, data of an object per se may contain identification information of a policy. Further, to set a policy for an object is also referred to as "to apply" the policy to the object. For use of an object having a policy already set, the contents of the policy are retrieved and acquired from the policy DB 32 based on identification information of the policy set for the object, and use of the object is limited in accordance with the acquired contents of the policy.

The example of configuration of the policy registration apparatus 10 will be described below in detail. The policy registration apparatus 10 includes an object selection acceptance portion 102, an object information acquisition portion 104, a policy creation portion 106, a policy registration portion 108, and a storage portion 110.

Figure 2:
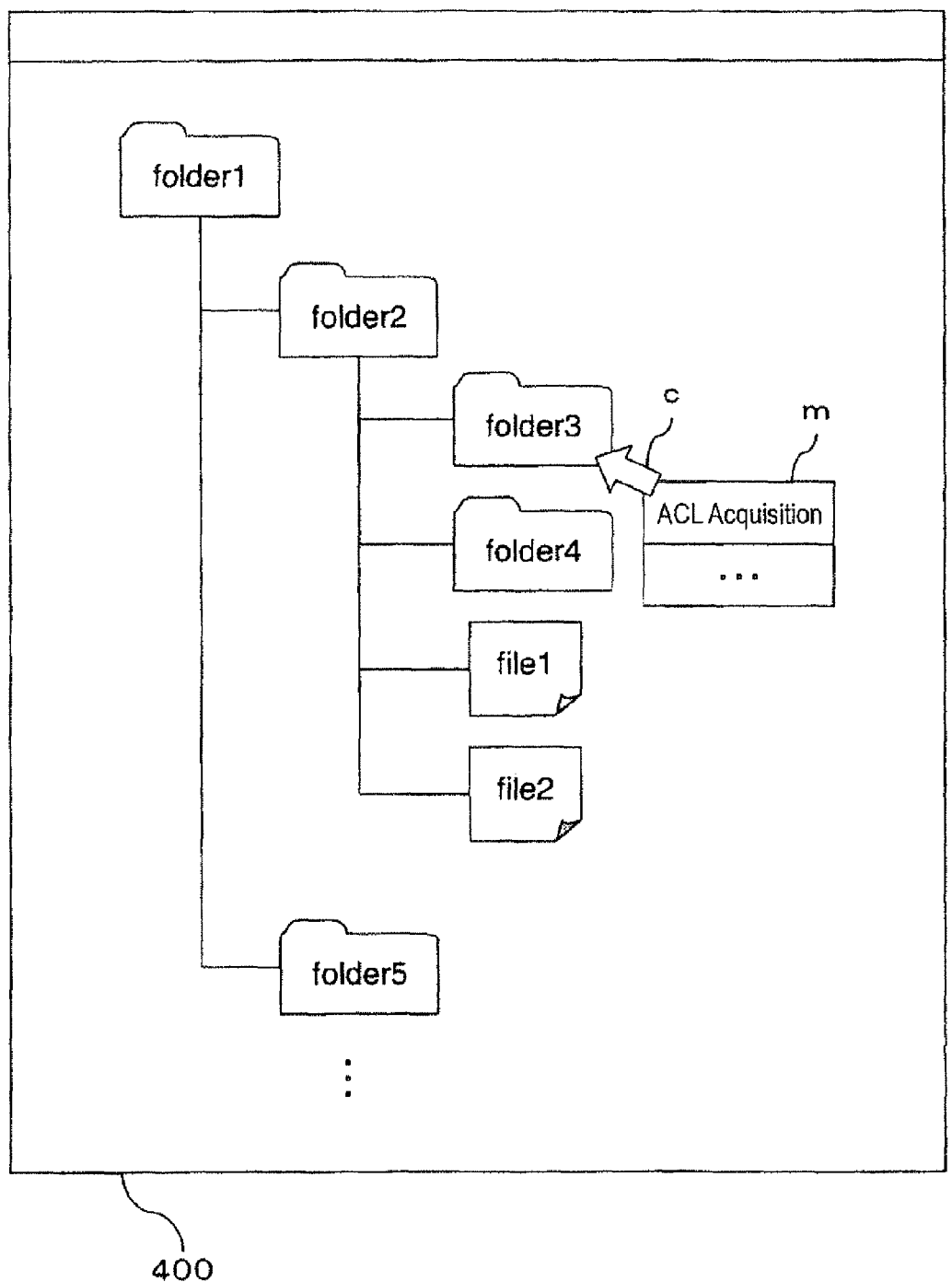
FIG. 2 is a view showing an example of a display screen displayed on a display device.

The object selection acceptance portion 102 accepts user's selected one of objects managed by the document management system 20. As will be described later, a policy is created based on the selected object accepted by the object selection acceptance portion 102. For example, the object selection acceptance portion 102 accesses the document management system 20, acquires information indicating objects managed by the document management system 20, and displays the acquired information on a display device (not shown). FIG. 2 shows an example of a display screen displayed on the display device. Referring to FIG. 2, the screen 400 shows schematically part of objects managed by the document management system 20 and a hierarchical structure formed from the objects. The user having confirmed the display as shown in the example of FIG. 2 inputs an instruction to select one of the displayed objects by using an input device (not shown) such as a mouse or a keyboard. The object selection acceptance portion 102 acquires the input instruction from the input device in this manner, and acquires identification information of the object selected based on the acquired instruction. In the example of FIG. 2, "ACL acquisition" is clicked from a menu m which is displayed when the user puts a cursor c of the mouse on the position of an object "folder3" in the screen 400 (or when the user executes "a right click" while putting the cursor c on the position of the object "folder3"), so that an instruction to select the object "folder3" is accepted by the object selection acceptance portion 102 in accordance with the input.

Referring back to FIG. 1, the object information acquisition portion 104 acquires information concerned with the object from the document management system 20. For example, the object information acquisition portion 104 acquires an ACL set for the selected object (hereinafter referred to as "designated object") accepted by the object selection acceptance portion 102. For example, the object information acquisition portion 104 may also acquire attribute information of the designated object. Upon acquisition of identification information of the designated object from the object selection acceptance portion 102, the object information acquisition portion 104 sends the acquired identification information of the designated object to the document management system 20 and requests the document management system 20 to send back at least either of the ACL and the attribute information. In response to the request, the document management system 20 acquires the ACL (and the attribute information) associated with the identification information of the designated object from the document DB 22, and sends the ACL (and the attribute information) back to the object information acquisition portion 104.

FIGS. 3 and 4 show examples of the contents of an ACL and attribute information of an object, respectively. FIG. 3 shows an example of the contents of an ACL set for an object "ObjectK". A table shown in the example of FIG. 3 indicates kinds of operations permitted to a certain user or a certain group. The table in the example of FIG. 3 includes items "user/group" and "privilege". Identification information of a user or a group as a subject of operation is set in the item "user/group". Kinds of operations permitted to a corresponding "user/group" are registered in the item "privilege". In the example of FIG. 3, a line L1 of the ACL indicates that all kinds of operations on the object "ObjectK" are permitted to a user "Hanako Fuji" (full control), a line L2 indicates that operations "read", "write" and "change" on the object "ObjectK" are permitted to a user "Fuji Taro", and a line L3 indicates that an operation "read" on the object "ObjectK" is permitted to users belonging to a group "Developer T".

FIG. 4 shows an example of the attribute information of the object "ObjectK". In a table shown in the example of FIG. 4, "Attribute" indicating each item of attribute information and "Value" indicating an attribute value of the item are associated with each other. In the example of FIG. 4, items "Type", "Object Name", "Creator", and "Inheritance of ACL" are shown as "Attribute". The "Type" indicates the type of an object. In this exemplary embodiment, the value of the "Type" is set to be either "folder" or "file". In the example of FIG. 4, the "Type" of the object "ObjectK" is "folder". The "Object Name" indicates a name given to the object by a user or the system. The "Creator" indicates identification information of the user who has created the object. The "Inheritance of ACL" is an item which is set for a "folder" "Type" object and which indicates whether the ACL of the object is inherited to a child object of the object or not. To "inherit" an ACL means to set an ACL having the same contents as the ACL of a certain object for a child object of the object. In other words, to "inherit" an ACL means to set an ACL having the same contents as the ACL of a certain folder for any object stored in the folder. In the example of FIG. 4, the value "apply to child object" of the attribute "Inheritance of ACL" of the object "ObjectK" means that the ACL of the object "ObjectK" is inherited to any child object of the object "ObjectK". When the ACL is not inherited to the child object, the value of the attribute "Inheritance of ACL" may be set, for example, to "not apply to child object" in advance. Incidentally, in this exemplary embodiment, the value of the attribute "Inheritance of ACL" of a file type object is set to be "Null". Incidentally, FIG. 4 simply shows an example of the contents of attribute information, but a part of the items exemplified in FIG. 4 need not be included. Alternatively, other items than the items exemplified in FIG. 4 may be further included. For example, items "Object Creation Time", "Object Update Time", "User (Authorizer)" to authorize the contents of the object, "Storage Position", etc. may be further included.

Referring to FIG. 1 again, the policy creation portion 106 creates a policy including information indicated by the ACL of the designated object acquired by the object information acquisition portion 104. The policy indicates a policy of limited use of the object. The policy is described in a different form from the ACL. For example, the descriptive form of the policy may be set by the system administrator or the like and stored in the storage portion 110 in advance. The policy may further include information not included in the ACL. In addition, the policy creation portion 106 may create information as part of the policy by using the attribute information of the designated object acquired by the object information acquisition portion 104.

FIG. 5 shows an example of the contents of the policy created by the policy creation portion 106. FIG. 5 shows an example of the policy created based on the ACL of the object "ObjectK" exemplified in FIG. 3. In the example of FIG. 5, the policy contains items "Creator", "Privilege", "Policy for Derived Object", "Valid Duration", "Offline Duration", "Print Option", and "Temporary Use".

The "Creator" indicates a person which creates the policy. In this exemplary embodiment, identification information of a user having inputted an instruction to select a designated object is set in the item "Creator" of the policy. The item "Privilege" indicates operation privileges on the policy and an object associated with the policy.

Information of "Privilege" is defined based on a combination of "User/Group", "Policy Access Right" and "Object Access Right". The "User/Group" indicates a user or a group as a subject of operation. The item "User/Group" may be described based on identification information of the user or group. Alternatively, the item "User/Group" may be described based on information indicating a user's role such as "Policy Creator" and "Object Creator" in the example of FIG. 5. The "Policy Access Right" indicates kinds of operations permitted to a corresponding user/group on the policy. In the example of FIG. 5, the "Policy Creator" can execute operations "edit" and "change status" on the policy. In the example, the value of the "Policy Access Right" is an initial value (default value) set in advance. The "Object Access Right" indicates kinds of operations permitted to a corresponding user/group on the object with the already set policy. In the item "Privilege", part of a combination of values of the "User/Group" and the "Object Access Right" indicates the same contents as the ACL of the designated object. In the example of FIG. 5, a portion encircled by a broken line A indicates the same access privilege as the combination of the values of the "User/Group" and the "Privilege" of the ACL in the example of FIG. 3. In addition, values of the "Object Access Right" of the "Object Creator" in the item "Privilege" of the policy in the example of FIG. 5 are generated by use of the ACL of the designated object and attribute information of the designated object. More specifically, because the creator of the designated object obtained from the attribute information of the designated object is "Hanako Fuji" (see FIG. 4) and because the privilege of "Hanako Fuji" in the ACL of the designated object is "full control" (see FIG. 3), all kinds of defined operations are set as values of the "Object Access Right" of the "Object Creator" in the item "Privilege" on the policy based on these pieces of information. Incidentally, in the example of FIG. 5, each line in which the value of "Policy Access Right" or "Object Access Right" is blank (–) indicates that operation of the policy or object is forbidden to a corresponding user/group.

The item "Policy for Derived Object" indicates whether the policy is set for any other object derived from the object with the set policy or not. To "derive" any other object from an object means to create one or more other objects as a result of operation on one object. For example, to "copy" an object or to "save as another name" an object may be regarded as to "derive" the object. Besides to operate an object which is electronic information, to create another paper document by copying a paper document, to create a paper document by printing an electronic document, and to create an electronic document by scanning and reading a paper document are regarded as to "derive" the object in terms of creation of another document from one document. In the example of FIG. 5, the value of the item "Policy for Derived Object" is "apply this policy". When another object is derived from an object with the set policy in the case of this example, the system sets the policy for the other object automatically. When the policy must not be set for the derived other object, the value of the item "Policy for Derived Object" may be set, for example, to "not apply this policy" in advance. In the case of this example, the system is never set the policy for the derived object automatically. In this exemplary embodiment, the value of the item "Policy for Derived Object" is determined in accordance with the value of the attribute "Inheritance of ACL" in the attribute information of the designated object or the parent object of the designated object. Specifically, when the value of the attribute "Inheritance of ACL" is a value indicating that an ACL having the same contents as the designated object should be set for a child, such as "apply to the child object", the value of the item "Policy for Derived Object" is set to "apply this policy". On the other hand, when the value of the attribute "Inheritance of ACL" is a value indicating that an ACL having the same contents as the designated object need not be set for the child, such as "not apply to the child object", the value of the item "Policy for Derived Object" is set to "not apply this policy".

The item "Valid Duration" indicates a duration for which the policy is valid. A user or group indicated by the "User/Group" in the item "Privilege" is permitted to execute operations indicated by the "Object Access Right" on the object during the valid duration. In the example of FIG. 5, the value of the item "Valid Duration" is unset and indicates that the duration is indefinite.

The item "Offline Duration" indicates a duration for which the user or the like can use the object without accessing the policy server because a license in which privilege is described is issued to the user or the like. When the offline duration is unset, it indicates that authentication of privilege due to the policy server is always required. In the example of FIG. 5, the value of the item "Offline Duration" is unset and indicates that authentication of privilege due to the policy server is always required.

"Print Option" indicates the contents of processing which is performed when a file of an object with the already set policy is printed. In the example of FIG. 5, the value "tint block" of the "Print Option" indicates printing with a pattern or code showing other information than the contents of the file as the background. For example, information printed as "tint block" may be information concerned with a printing operation, such as identification information of a user executing the printing operation, printing time, identification information of a printer performing printing, etc. Or the name of an organization such as an enterprise or a group using the document management system 20, attribute information of the file to be printed, etc. may be printed as "tint block". Another example of the "Print Option" includes processing for printing a character string concerned with security, such as "company confidential" or "group confidential", together with the contents of the file.

The item "Temporary Use" indicates whether temporary access right control different from an access right range described in the policy is permitted only on a specified object or not. When temporary access right control is permitted, a right range such as a user to be permitted, a duration, etc. is described. For example, this item "Temporary Use" is used when access right for only the object should be able to be given to members of another section than a project section during a project to achieve temporary use of a policy allowed to be accessed by only members of the project section. The value "disabled" of "Temporary Use" in the example of FIG. 5 indicates that temporary use is disabled.

Incidentally, initial values determined in advance and stored in the storage portion 110 may be set in items contained in the policy and neither contained in information indicated by the ACL of the designated object nor created by use of the attribute information of the designated object. In the example of FIG. 5, initial values determined in advance are set in the items "Policy Access Right" of "Policy Creator", "Valid Duration", "Offline Duration", "Print Option" and "Temporary Use".

Referring to FIG. 1 again, the policy creation portion 106 includes a non-inherited ACL list creation portion 1060. The non-inherited ACL list creation portion 1060 accesses the document management system 20 and specifies objects having ACL's different in contents from the ACL of its own parent object, among the designated object and child objects of the designated object. In the description of this exemplary embodiment, the ACL's of the objects specified in this manner are referred to as "non-inherited ACL's". In addition, a list including combinations of the objects specified in this manner and the non-inherited ACL's are referred to as "not-inherited ACL list". In this exemplary embodiment, the non-inherited ACL list creation portion 1060 further creates information specifying each object having the attribute "Inheritance of ACL" set as "apply to child object" in attribute information of its own parent object, among objects in the non-inherited ACL list.

FIG. 6 shows an example of the non-inherited ACL list. A table in the example of FIG. 6 includes items "Object Name", "ACL" and "Conflict Flag". The item "Object Name" indicates the name of each object having an ACL different in contents from the ACL of its own parent object. The item "ACL" indicates the contents of the ACL of an object having a corresponding object name. The item "Conflict Flag" indicates whether the attribute "Inheritance of ACL" is equal to "apply to child object" in attribute information of a parent object of the object having the corresponding object name or not. The value "true" of the conflict flag indicates that the attribute "Inheritance of ACL" of the parent object is equal to "apply to child object". The value "false" of the conflict flag indicates that the attribute "Inheritance of ACL" of the parent object is not equal to "apply to child object".

Referring to FIG. 1 again, the policy registration portion 108 performs a process of registering the policy created the policy creation portion 106 in the policy DB 32 of the policy server 30. For example, the policy registration portion 108 accesses the policy server 30, and confirms whether a policy expressing the same contents as the policy created by the policy creation portion 106 has been already registered in the policy DB 32 of the policy server 30 or not. When the policy has not been registered, the policy registration portion 108 requests the policy server 30 to register the policy in the policy DB 32. The policy server 30 registers the policy in the policy DB 32 in accordance with this request.

The storage portion 110 is a storage device which stores information used in processing in the policy registration apparatus 10 and a result of processing in the policy registration apparatus 10. For example, the storage portion 110 stores information indicating the form of the policy created by the policy creation portion 106 and initial values of part of items in the policy. The storage portion 110 further stores the policy created by the policy creation portion 106 and the non-inherited ACL list created by the non-inherited ACL list creation portion 1060.

An example of a procedure of processing executed by the policy registration apparatus 10 will be described below.

Figure 7:
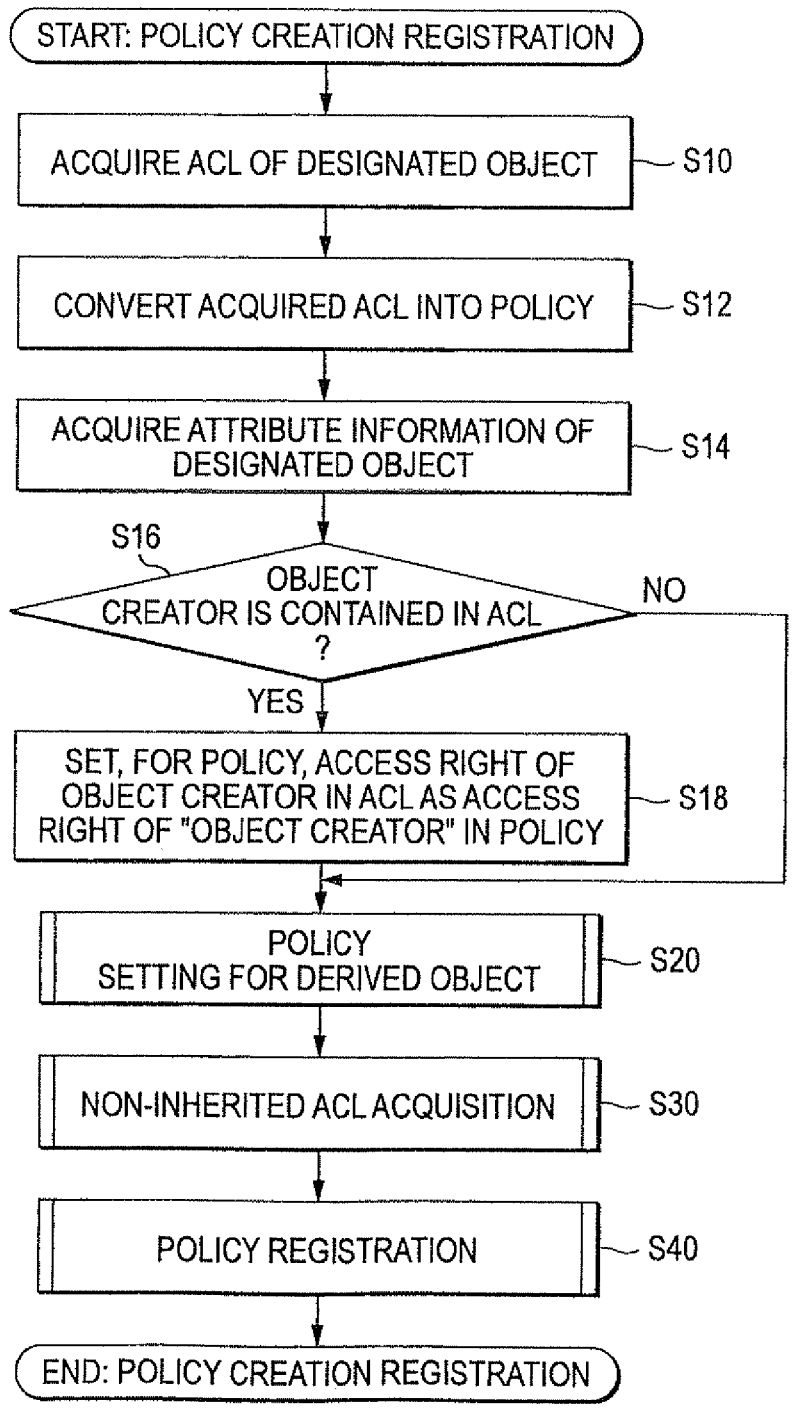
FIG. 7 is a flow chart showing an example of a procedure of a policy creation registration process.

FIG. 7 is a flow chart showing an example of a procedure of a policy creation registration process executed by the policy registration apparatus 10. When, for example, selection of a designated object is accepted by the object selection acceptance portion 102, the policy registration apparatus 10 starts a process having a procedure shown in the example of FIG. 7.

Referring to FIG. 7, the ACL of the designated object is first acquired by the object information acquisition portion 104 which has accepted identification information of the designated object from the object selection acceptance portion 102 (step S10). In the step S10, the object information acquisition portion 104 sends the identification information of the designated object together with an ACL acquisition request to the document management system 20, and acquires the ACL of the designated object returned in response of this request. The object information acquisition portion 104 sends the acquired ACL of the designated object to the policy creation portion 106.

The policy creation portion 106 converts the ACL of the designated object received from the object information acquisition portion 104 into a policy (step S12). In the step S12, for example, the policy creation portion 106 acquires information indicating the form of the policy from the storage portion 110, and sets values of items corresponding to information indicated by the ACL in the acquired form of the policy. Specifically, the ACL in the example of FIG. 3 is the ACL of the designated object. When the policy having the form in the example of FIG. 5 is to be created, the policy creation portion 106 sets a combination of values of "User/Group" and "Privilege" in the ACL of the designated object as a combination of values of "User/Group" and "Object Access Right" in the item "Privilege" in the created policy (a region encircled by the broken line A in FIG. 5). On this occasion, the description of the privilege "full control" of a user "Hanako Fuji" in the ACL is converted into a description "read, write, change, print, copy" indicating all kinds of operations permitted in the policy in this example. The policy creation portion 106 further sets identification information of the user selecting the designated object as a creator in the policy to be created, and sets other items than information indicated by the ACL in the example of FIG. 3 to initial values.

Then, attribute information of the designated object is acquired by the object information acquisition portion 104 (step S14). In the step S14, the object information acquisition portion 104 sends the identification information of the designated object together with an attribute information acquisition request to the document management system 20, and acquires attribute information of the designated object returned in response of this request. The object information acquisition portion 104 sends the acquired attribute information of the designated object to the policy creation portion 106.

When the creator of the designated object received from the object information acquisition portion 104 is contained in the ACL (YES in step S16), the policy creation portion 106 sets access right of the creator of the designated object defined by the ACL of the designated object as access right of the "Object Creator" in the policy (step S18). Using the aforementioned specific example again while referring to FIGS. 3 and 5, when the attribute information of the designated object is attribute information in the example of FIG. 4, the creator "Hanako Fuji" (FIG. 4) of the designated object is contained in "User/Group" in the ACL of the designated object, so that determination in the step S16 results in YES and processing goes to step S18. In the step S18, the policy creation portion 106 sets values (a list of all kinds of operations) corresponding to the privilege "full control" of "Hanako Fuji" in the ACL in "Object Access Right" of "Object Creator" in the policy.

On the other hand, when the creator of the designated object is not contained in the ACL of the designated object (NO in step S16), processing of the step S18 is omitted and processing goes to step S20.

Figure 8:
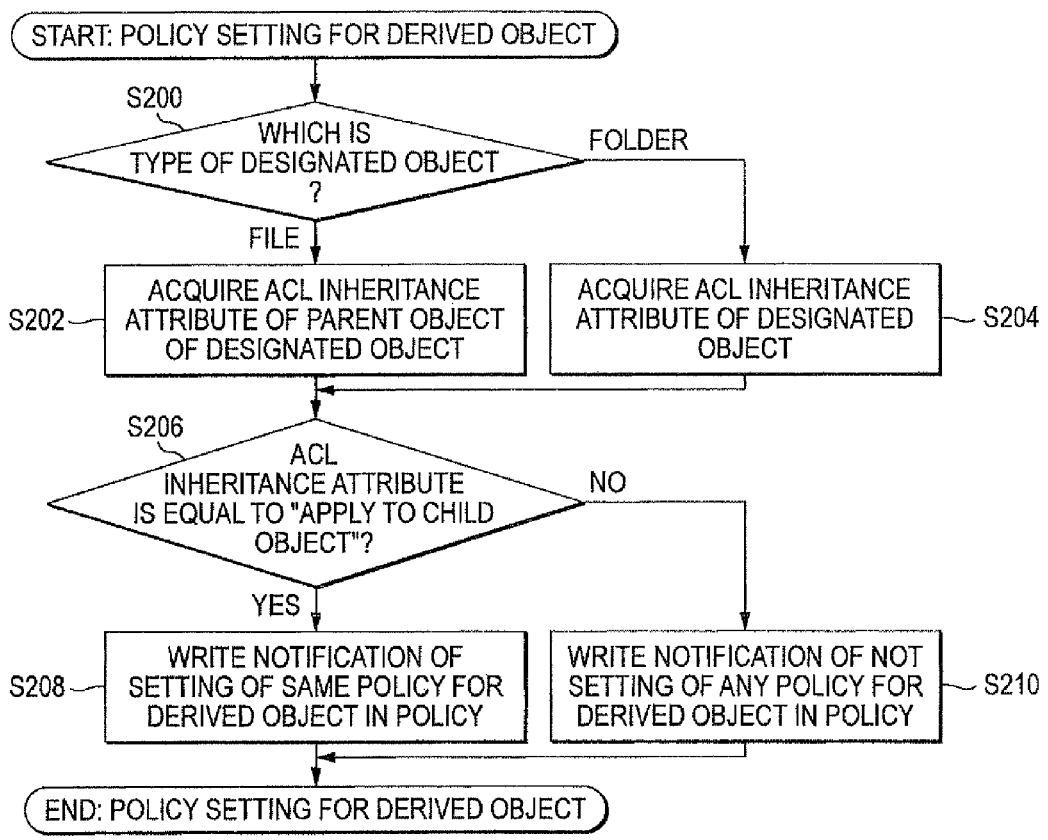
FIG. 8 is a flow chart showing an example a procedure of a "Policy for Derived Object" setting process.

In the step S20, the policy creation portion 106 performs a process of setting the value of the item "Policy for Derived Object" in the created policy. FIG. 8 shows an example of a detailed procedure of the "Policy for Derived Object" setting process shown in the step S20 of FIG. 7. When the step S20 of FIG. 7 is started, processing having the procedure shown in the example of FIG. 8 is started.

Referring to FIG. 8, the policy creation portion 106 first confirms the type of the designated object by referring to the attribute information of the designated object (step S200).

When the designated object is of a file type, the value of the attribute "Inheritance of ACL" in the attribute information of the parent object of the designated object is acquired (step S202). For example, the step S202 is performed as follows. First, the policy creation portion 106 requests the object information acquisition portion 104 to acquire the attribute information of the parent object of the designated object. Upon reception of this request, the object information acquisition portion 104 requests the document management system 20 for the attribute information of the parent object of the designated object together with the identification information of the designated object. In accordance with this request, the document management system 20 specifies the parent object of the designated object by referring to information indicating the hierarchical structure of objects stored in the document DB 22 by using the identification information of the designated object. Then, the document management system 20 acquires the attribute information of the parent object of the designated object from the document DB 22 and sends it to the object information acquisition portion 104 of the policy registration apparatus 10. The attribute information of the parent object of the designated object is delivered from the object information acquisition portion 104 to the policy creation portion 106, so that the policy creation portion 106 acquires the value of the attribute "Inheritance of ACL" from the received attribute information.

On the other hand, when the step S200 confirms that the designated object is of a folder type, the value of the attribute "Inheritance of ACL" in the attribute information of the designated object is acquired (step S204).

When the value of the attribute "Inheritance of ACL" acquired by the step S202 or S204 is "apply to child object" (YES in step S206), notification of setting the same policy for a derived object is written in the created policy (step S208). In this exemplary embodiment, the value of the item "Policy for Derived Object" in the created policy is set to "apply this policy".

When the value of the attribute "Inheritance of ACL" acquired by the step S202 or S204 is not "apply to child object" (NO in step S206), notification of setting no policy for a derived object is written in the created policy (step S210). In this exemplary embodiment, the value of the item "Policy for Derived Object" in the created policy is set to "not apply this policy".

After the step S208 or S210, the "Policy for Derived Object" setting process having the procedure in the example of FIG. 8 is terminated. According to the "Policy for Derived Object" setting process, the value of the item "Policy for Derived Object" in the created policy using the ACL of the designated object is set to a value on which the ACL inheritance relation between the designated object and a child of the designated object or the ACL inheritance relation between the parent of the designated object and the designated object is reflected.

Referring to FIG. 7 again, when the "Policy for Derived Object" setting process (step S20 in FIG. 8) is terminated, a non-inherited ACL acquisition process is performed by the non-inherited ACL list creation portion 1060 (step S30). An example of a detailed procedure of the non-inherited ACL acquisition process in the step S30 of FIG. 7 will be described with reference to FIGS. 9 and 10. When the step S30 of FIG. 7 is started, processing having the procedure in the example of FIG. 9 is started.

Figure 9:
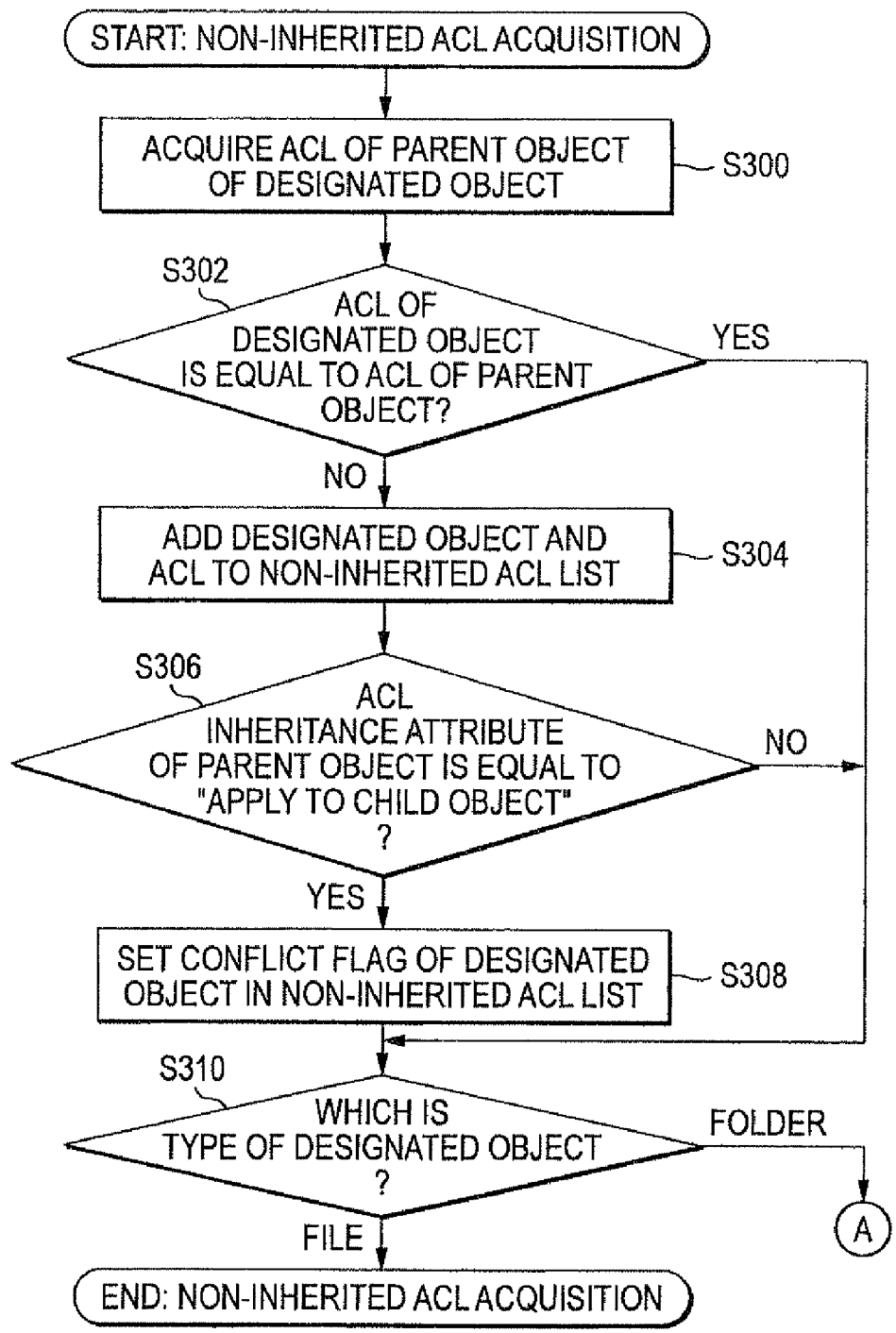
FIG. 9 is a flowchart showing an example of a partial procedure of a non-inherited ACL acquisition process.

Referring to FIG. 9, the non-inherited ACL list creation portion 1060 acquires the ACL of the parent object of the designated object (step S300). For example, the non-inherited ACL list creation portion 1060 may acquire the ACL of the parent object of the designated object from the document management system 20 through the object information acquisition portion 104 by the same procedure as the procedure described with reference to the step S202 of FIG. 8.

Then, the non-inherited ACL list creation portion 1060 determines whether the contents of the ACL of the parent object are the same as the contents of the ACL of the designated object or not (step S302).

When the contents of the ACL of the patent object are not the same as the contents of the ACL of the designated object (NO in step S302), the designated object and the ACL of the designated object are added to the non-inherited ACL list (step S304). In the case of the non-inherited ACL list exemplified in FIG. 6, a combination of the object name acquired from the attribute information of the designated object and the ACL of the designated object is added to the non-inherited ACL list in the step S304, and the value of a corresponding conflict flag is set to "false".

After the step S304, the non-inherited ACL list creation portion 1060 determines whether the attribute "Inheritance of ACL" in the attribute information of the parent object of the designated object is equal to "apply to child object" or not (step S306). When the attribute information of the parent object of the designated object has been already acquired by the process of the step S202 of FIG. 8, the attribute information is used. When the attribute information of the parent object of the designated object has not been acquired yet, the attribute information of the parent object of the designated object may be acquired by the same process as the step S202 of FIG. 8.

When the attribute "Inheritance of ACL" of the parent object of the designated object is equal to "apply to child object" (YES in step S306), a conflict flag of the designated object is set (step S308). That is, the value of a conflict flag corresponding to the designated object is set to "true" in the non-inherited ACL list.

When the attribute "Inheritance of ACL" of the parent object of the designated object is not equal to "apply to child object" (NO in step S306), a conflict flag of the designated object is not set (step S308) but processing goes to step S310. In this case, the value of a conflict flag corresponding to the designated object is set to "false" as it is.

After determination in the step S302 results in YES, after determination in the step S306 results in NO, or after the step S308, the non-inherited ACL list creation portion 1060 confirms the type of the designated object by referring to the attribute information of the designated object (step S310). When the designated object is of a file type, the non-inherited ACL acquisition process is terminated. When the designated object is of a folder type, processing goes to step 312 of FIG. 10.

Figure 10:
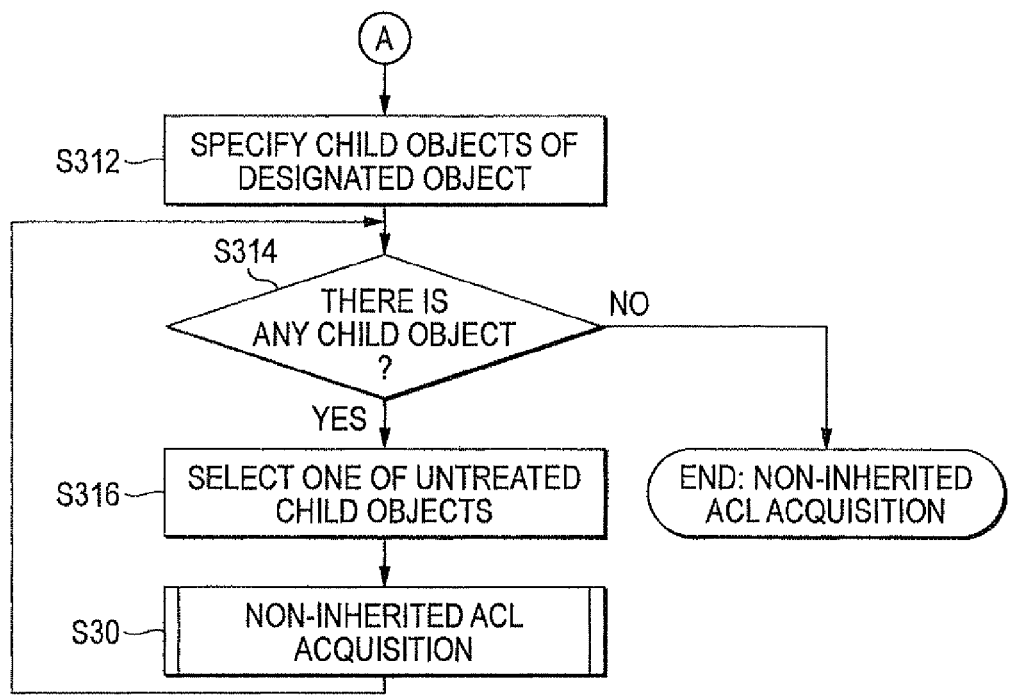
FIG. 10 is a flow chart showing an example of a partial procedure of a non-inherited ACL acquisition process.

Referring to FIG. 10, in the step S312, the non-inherited ACL list creation portion 1060 accesses the document management system 20 and specifies child objects of the designated object (step S312). For example, in the step S312, while the non-inherited ACL list creation portion 1060 sends the identification information of the designated object to the document management system 20, the non-inherited ACL list creation portion 1060 inquires whether there is any child object of the designated object or not. In response to this inquiry, the document management system 20 confirms the presence/absence of any child object of the designated object by using the identification information of the designated object and information indicating the hierarchical structure of objects in the document DB 22. When there is any child object, identification information of the child object is sent back to the policy registration apparatus 10. When there is no child object (that is, when there is no object stored in the folder which is the designated object), information indicating this fact is sent back to the policy registration apparatus 10.

When there is no child object of the designated object or when all the specified child objects have been already treated, determination in the step S314 results in NO and the non-inherited ACL acquisition process is terminated.

When there is any untreated child object in the child objects specified by the step S312 (YES in step S314), the non-inherited ACL list creation portion 1060 selects one of untreated child objects (step S316). Then, the non-inherited ACL acquisition process (FIGS. 9 and 10) is called recursively and executed with the selected child object as a subject of processing (designated object) (step S30).

After the step S30 of FIG. 10, processing goes back to the step S314 to determine whether there is any untreated child object or not. While there is any untreated child object, processing of the step S316 et seq. is repeated. When there is no untreated child object, the non-inherited ACL acquisition process is terminated.

Referring to FIGS. 9 and 10, the non-inherited ACL list obtained as a result of the non-inherited ACL acquisition process contains objects each having an ACL different in contents from the ACL of its parent, and ACL's of the objects, among the designated object and all objects equivalent to children of the designated object in the hierarchical structure of objects. Further, the value of a conflict flag corresponding to each object the attribute "Inheritance of ACL" of the parent object of which is equal to "apply to child object", among the objects in the non-inherited ACL list, is set to "true". In the non-inherited ACL list, objects each having the value "true" of the conflict flag are objects each of which is set to have an ACL of the same contents as the ACL of its parent but has an ACL different in contents from the ACL of its parent.

Figure 11:
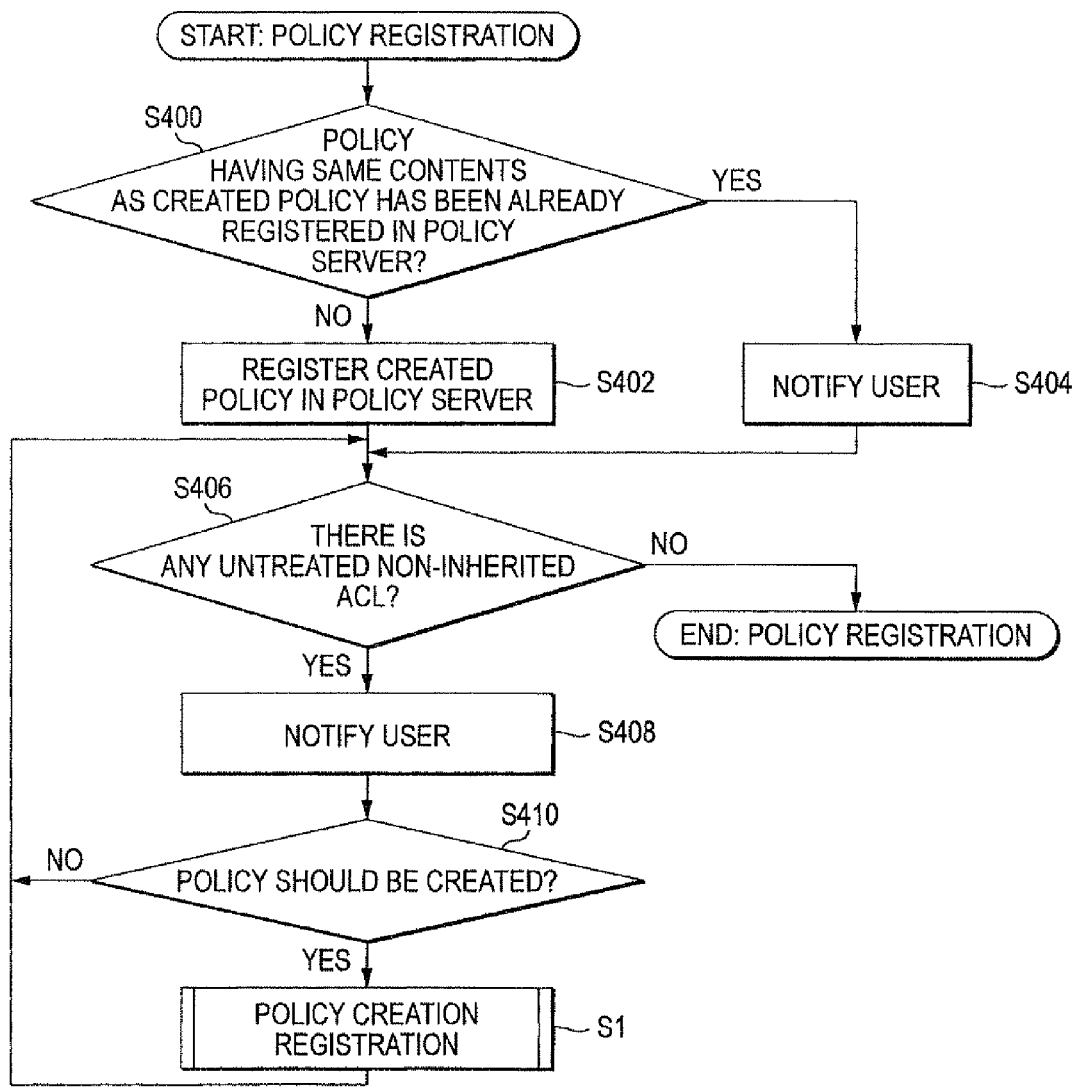
FIG. 11 is a flow chart showing an example of a procedure of a policy registration process.

Referring to FIG. 7 again, when the non-inherited ACL acquisition process (step S30 in FIGS. 9 and 10) is terminated, a policy registration process is performed by the policy registration portion 108 (step S40). FIG. 11 shows an example of a detailed procedure of the policy registration process. When the step S40 of FIG. 7 is started, the process having the procedure in the example of FIG. 11 is started.

Referring to FIG. 11, the policy registration portion 108 accesses the policy server 30 and confirms whether a policy having the same contents as the policy created by the policy creation portion 106 has been already registered in the policy DB 32 of the policy server 30 or not (step S400).

When the created policy has not been registered in the policy DB 32 yet (NO in step S400), the created policy is registered in the policy DB 32 (step S402). For example, in the step S402, the policy registration portion 108 gives identification information to the created policy and sends the created policy together with the given identification information to the policy server 30. In the policy server 30 receiving the identification information of the policy and the policy, the received identification information and the contents of the policy are registered in the policy DB 32 while they are associated with each other. Incidentally, the identification information of the policy may be created and given by the policy server 30 in place of the policy registration apparatus 10.

When the created policy has been already registered in the policy server 30 (YES in step S400), notification of the fact is given to the user (step S404). For example, the notification in the step S404 is performed in such a manner that the fact that the policy has been already registered is displayed on a display device (not shown).

The step S406 and steps after the step S406 are steps performed for the non-inherited ACL list by the policy creation portion 106 (steps S406 to S410 and step S1). The steps will be described below in detail.

After the step S402 or S404, the policy creation portion 106 refers to the non-inherited ACL list in the storage portion 110 and confirms whether there is any untreated non-inherited ACL in the non-inherited ACL list or not (step S406). When there is no untreated non-inherited ACL (NO in step S406), the policy registration process having the procedure shown in the example of FIG. 11 is terminated.

When there is any untreated non-inherited ACL (YES in step S406), notification of the fact is given to the user (step S408). For example, in the step S408, the name of an object corresponding to the untreated non-inherited ACL, the contents of the untreated non-inherited ACL and the value of the conflict flag are displayed on a display device (not shown). In this exemplary embodiment, information for inquiring of the user whether a policy is created with an object having the displayed non-inherited ACL as a designated object or not, is further displayed on the display device. The displayed object name, the contents of the non-inherited ACL and the value of the conflict flag help the user to judge whether a policy is created for an object corresponding to the non-inherited ACL or not.

When the user confirming the contents of notification in the step S408 gives an instruction to create a policy with an object corresponding to the non-inherited ACL as a designated object (YES in step S410), the policy creation portion 106 performs the policy creation registration process with the object as a designated object (step S1). When the step S1 is started, the policy creation registration process having the procedure shown in the example of FIG. 7 is started with an object corresponding to the non-inherited ACL as a designated object.

When the user confirming the contents of notification in the step S408 gives an instruction to create no policy (NO in step S410) or after the step S1 (the policy creation registration process for an object corresponding to the non-inherited ACL), processing goes back to the step S406. A loop process including the steps S406, S408, S410 and S1 is repeated until processing for all non-inherited ACL's in the non-inherited ACL list is completed.

When the policy registration process having the procedure shown in the example of FIG. 11 is terminated, the policy creation registration process having the procedure shown in the example of FIG. 7 is also terminated.

Incidentally, in the policy registration process, user's editing the contents of the created policy may be accepted before the determination in the step S400 in the procedure shown in the example of FIG. 11. For example, while the contents of the created policy are displayed on the display device, user's editing to set another value in each item having an initial value set in advance in the created policy or change the value of each item created from the ACL and attribute information is accepted through an input device. Alternatively, user's editing the contents of the policy may be performed after the policy registration process is terminated. For example, the contents of a policy which has been already registered in the policy DB 32 may be updated in such a manner that the policy registration apparatus 10 acquires the registered policy in the policy DB 32 from the policy server 30 to make the user edit the contents of the acquired policy, and sends the edited policy to the policy server 30.

In the procedure shown in the example of FIG. 11, objects in the non-inherited ACL list are displayed one by one successively to make the user instruct whether the policy creation registration process is to be executed or not. In another example, while the non-inherited ACL list is displayed on the display device, the user may be made to select one or more objects to be subjected to the policy creation registration process from the non-inherited ACL list. In this case, the policy creation registration process is performed while each of the objects selected from the non-inherited ACL list is used as a designated object.

In the procedure shown in the example of FIG. 11, whether the policy creation registration process is to be executed or not, may be determined for each object in the non-inherited ACL list without acceptance of any user's instruction. For example, determination is made in accordance with the value of each conflict flag in the non-inherited ACL list. For example, determination may be made so that the policy creation registration process is executed when the value of the conflict flag is "true", but the policy creation registration process is not executed when the value of the conflict flag is "false". An object having the value "true" of the conflict flag has an ACL different in contents from its parent though notification of inheritance of the parent's ACL is set. In this case, it is conceived that the system administrator or the user has intentionally set the ACL of the object to be different from the ACL of its parent. Accordingly, in this example, determination is made so that the policy creation registration process is executed for an object having the value "true" of the conflict flag in order to create newly a policy corresponding to the ACL of the object. On the other hand, an object having the value "false" of the conflict flag has an ACL different from the parent's ACL but notification of inheritance of the parent's ACL is not set. In this case, it is conceived that an ACL different from the parent's ACL is not particularly intentionally set for the object. Accordingly, in this example, determination is made so that the policy creation registration process is not executed for an object having the value "false" of the conflict flag.

In the exemplary embodiment described above, the value of the item "Policy for Derived Object" in the policy may be determined by another procedure than the procedure shown in the example of FIG. 8. For example, when the attribute "Inheritance of ACL" of the designated object or parent object is not equal to "apply to child object" in the procedure shown in the example of FIG. 8, the value of the item "Policy for Derived Object" may be determined based on the contents of the item "Privilege" in the created policy in place of setting to "not apply this policy" in the step S210. As a specific example, when there is any user/group permitted to perform kinds of operations (copy, print, scan, etc.) accompanying derivation of the object, a value indicating notification of application of a policy predefined as a default policy is set in the item "Policy for Derived Object". When there is no user/group permitted to perform kinds of operations accompanying derivation of the object, the value of the item "Policy for Derived Object" is set to "not apply this policy".

In the example of processing performed by the policy registration apparatus 10 as described above with reference to FIGS. 7 to 11, a policy is only created and registered in the policy DB 32 of the policy server 30 but a process of applying the created policy to an object is not performed. In another example, the process of applying the created policy to an object, as well as the aforementioned policy creation registration process, may be performed. For example, the created policy is applied to the designated object. The created policy may be further applied to objects not contained in the non-inherited ACL list, among child objects of the designated object. For example, the policy created based on the designated object may be applied to objects for which determination is made so that the policy creation registration process is not executed, among objects in the non-inherited ACL list. For example, the process of applying the policy to an object is performed in such a manner that the identification information of the policy and the identification information of the object to be subjected to application are registered in the document DB 22 of the document management system 20 while they are associated with each other. Alternatively, the process may be performed in such a manner that the identification information of the policy is set as one item of the attribute information of the object to be subjected to application.

Incidentally, in this exemplary embodiment, the ACL and attribute information of each object are stored in the document DB 22. In another example, the attribute information and ACL may be stored together with the object in the storage device storing the object itself in place of the document DB 22.

In this exemplary embodiment, the ACL and policy contain each combination of an operation subject and kinds of operations permitted to the operation subject. In another example, the ACL and policy may contain each combination of an operation subject and kinds of operations forbidden to the operation subject.

An exemplary embodiment of the invention has been described above by way of example in the case where an ACL which has been already set for an object is used for creating a policy. In another exemplary embodiment, a policy according to one form may be used for creating a policy according to another form in the same manner as the aforementioned processing.

Though not shown above, the document management system 20 limits use of each object in accordance with a policy by using a user DB for managing authentication information of the user. For example, when the user starts use of the document management system 20, the document management system 20 performs user authentication by referring to authentication information in the user DB. When the authenticated user makes a request to operate an object, a policy applied to the object is acquired from the policy DB 32. When the contents of the acquired policy indicate that the user is permitted to execute the requested operation, execution of the requested operation is permitted. Limited use of each object in accordance with a policy can be achieved by use of a known technique.

Figure 12:
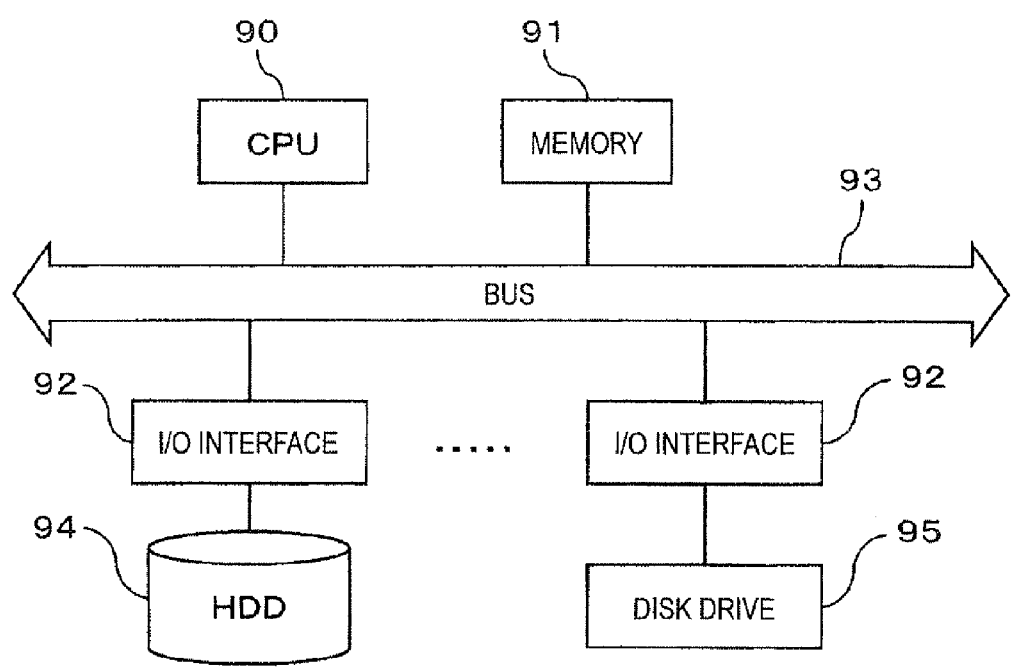
FIG. 12 is a view showing an example of hardware configuration of a computer.

The policy registration apparatus 10 described above is achieved typically by a general-purpose computer which executes a program in which functions or processing contents of respective portions of the aforementioned policy registration apparatus 10 are described. For example, as shown in FIG. 12, the computer has a circuit configuration as a hardware configuration in which a CPU (Central Processing Unit) 90, a memory (primary storage) 91, various kinds of I/O (input/output) interfaces 92, etc. are connected to one another through a bus 93. An HDD (Hard Disk Drive) 94 and a disk drive 95 for reading portable nonvolatile recording media of various standards such as a CD, a DVD, a flash memory, etc. are connected to the bus 93, for example, through the I/O interfaces 92. Such a drive 94 or 95 functions as an external storage device outside the memory. The program in which processing contents in the exemplary embodiment are described is stored in a stationary storage device such as the HDD 94 via a recording medium such as a CD or a DVD or via a network, so that the program is installed in the computer. The program stored in the stationary storage device is read out and loaded into the memory and executed by the CPU to thereby execute processing in the exemplary embodiment.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a hardware processor;
a memory containing instructions adapted to be executed by the hardware processor to cause the hardware processor to act as:
a creation unit that refers to a first limited use storage unit which stores each object as one information unit to be subjected to limited use and first limited use information containing each combination of an operation subject performing operations on the object and types of operations permitted or forbidden to the operation subject while associating the object with the first limited use information, wherein the first limited use storage unit further stores attribute information indicating an attribute of each object while associating the attribute information with the object, and the creation unit further acquires the attribute information which is associated with the designated object and stored in the first limited use storage unit, and creates second limited use information further containing information created based on the acquired attribute information, objects stored in the first limited use storage unit form a hierarchical structure, and the first limited use storage unit further stores for each of the objects, information indicating one of a parent object and a child object in the hierarchical structure,
wherein the creation unit acquires the first limited use information which is associated with a designated object and stored in the first limited use storage unit in accordance with an instruction to specify the designated object, and the second limited use information containing information indicated by the acquired first limited use information and described in a different form from the acquired first limited use information;
wherein the creation unit further acquires the first limited use information of a parent object of the designated object and the first limited use information of a child object of the designated object from the first limited use storage unit, specifies specified objects associated with the first limited use information different in contents from an object equivalent to its own parent, among the designated object and the child object of the designated object, and creates non-inherited object information which is information indicating the specified objects, and
wherein the non-inherited object information created by the creation unit further contains information specifying an object for which inheritance information indicating that the first limited use information is inherited to a child object is contained in attribute information associated with an object equivalent to its own parent, among non-inherited objects contained in the non-inherited object information; and
a registration unit that registers the second limited use information created by the creation unit in a second limited use storage unit.

2. The information processing apparatus according to claim 1,
wherein the second limited use information created by the creation unit further contains information which is not contained in the information indicated by the acquired first limited use information and which is set for limited use of the object in advance.

3. The information processing apparatus according to claim 1,
attribute information stored in the first limited use storage unit and associated with an object capable of having a child object of said object in the hierarchical structure contains inheritance information indicating whether the first limited use information of the object is inherited to the object equivalent to the child of the object or not, and
the creation unit creates the second limited use information further containing information indicating that the second limited use information should be associated with another object, when said another object is created by use of an object associated with the second limited use information when inheritance information indicating that the first limited use information is inherited to the child object is contained in the acquired attribute information or attribute information associated with the parent object of the designated object.

4. The information processing apparatus according to claim 3,
wherein the information processing apparatus further comprises an output unit which outputs the non-inherited object information created by the creation unit.

5. A computer-implemented information processing method comprising:
referring to a first limited use storage unit which stores each object as one information unit to be subjected to limited use and first limited use information containing each combination of an operation subject performing operations on the object and types of operations permitted or forbidden to the operation subject while associating the object with the first limited use information;
storing in the first limited use storage unit attribute information indicating an attribute of each object while associating the attribute information with the object;
acquiring the attribute information which is associated with the designated object and stored in the first limited use storage unit, and creating second limited use information further containing information created based on the acquired attribute information, forming a hierarchical structure from objects stored in the first limited use storage unit, and further storing in the first limited use storage unit for each of the objects, information indicating one of a parent object and a child object in the hierarchical structure;

acquiring the first limited use information which is associated with a designated object and stored in the first limited use storage unit in accordance with an instruction to specify the designated object;

the second limited use information containing information indicated by the acquired first limited use information and described in a different form from the acquired first limited use information;

further acquiring the first limited use information of a parent object of the designated object and the first limited use information of a child object of the designated object from the first limited use storage unit, specifying specified objects associated with the first limited use information different in contents from an object equivalent to its own parent, among the designated object and the child object of the designated object, and creating non-inherited object information which is information indicating the specified objects;

wherein the non-inherited object information created by the creation unit further contains information specifying an object for which inheritance information indicating that the first limited use information is inherited to a child object is contained in attribute information associated with an object equivalent to its own parent, among non-inherited objects contained in the non-inherited object information; and registering the created second limited use information in a second limited use storage unit.

6. A non-transitory computer readable medium storing a program causing a computer to execute a process for managing objects, the process comprising:

referring to a first limited use storage unit which stores each object as one information unit to be subjected to limited use and first limited use information containing each combination of an operation subject performing operations on the object and types of operations permitted or forbidden to the operation subject while associating the object with the first limited use information;

storing in the first limited use storage unit attribute information indicating an attribute of each object while associating the attribute information with the object;

acquiring the attribute information which is associated with the designated object and stored in the first limited use storage unit, and creating second limited use information further containing information created based on the acquired attribute information, forming a hierarchical structure from objects stored in the first limited use storage unit, and further storing in the first limited use storage unit for each of the objects, information indicating one of a parent object and a child object in the hierarchical structure;

acquiring the first limited use information which is associated with a designated object and stored in the first limited use storage unit in accordance with an instruction to specify the designated object;

the second limited use information containing information indicated by the acquired first limited use information and described in a different form from the acquired first limited use information;

further acquiring the first limited use information of a parent object of the designated object and the first limited use information of a child object of the designated object from the first limited use storage unit, specifying specified objects associated with the first limited use information different in contents from an object equivalent to its own parent, among the designated object and the child object of the designated object, and creating non-inherited object information which is information indicating the specified objects;

wherein the non-inherited object information created by the creation unit further contains information specifying an object for which inheritance information indicating that the first limited use information is inherited to a child object is contained in attribute information associated with an object equivalent to its own parent, among non-inherited objects contained in the non-inherited object information; and registering the created second limited use information in a second limited use storage unit.

* * * * *